United States Patent
Shin

(10) Patent No.: US 9,900,752 B2
(45) Date of Patent: Feb. 20, 2018

(54) METHOD AND APPARATUS FOR COMMUNICATION

(71) Applicant: Samsung Electronics Co., Ltd., Suwon-si (KR)

(72) Inventor: Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 14/526,918

(22) Filed: Oct. 29, 2014

(65) Prior Publication Data

US 2015/0237482 A1 Aug. 20, 2015

(30) Foreign Application Priority Data

Feb. 19, 2014 (KR) .......................... 10-2014-0019096

(51) Int. Cl.
*H04W 4/06* (2009.01)
*H04L 12/18* (2006.01)

(52) U.S. Cl.
CPC ............. *H04W 4/06* (2013.01); *H04L 12/189* (2013.01)

(58) Field of Classification Search
CPC ...... H04W 4/06; H04L 12/189; H04L 5/0035; H04L 5/0032; H04L 41/042; H04L 1/0077; H04L 12/1845; H04L 47/806; H04L 2012/5642; H04L 29/06455; H04L 61/2069; H04L 65/4076; H04L 12/185; H04L 12/1859; H04L 1/0076; H04L 1/0041; H04L 1/005; H04B 7/022; H04B 7/024; H04B 7/026

See application file for complete search history.

(56) References Cited

U.S. PATENT DOCUMENTS

| | | | |
|---|---|---|---|
| 2009/0067533 A1* | 3/2009 | Yuan | H04B 7/0697 375/267 |
| 2009/0147728 A1* | 6/2009 | Atia | H04B 7/0617 370/321 |
| 2009/0319824 A1 | 12/2009 | Liu et al. | |
| 2010/0106797 A1 | 4/2010 | Nagaraja | |
| 2010/0151876 A1* | 6/2010 | Park | H04W 72/082 455/452.2 |
| 2010/0309838 A1* | 12/2010 | Kwon | H04L 5/0023 370/315 |
| 2011/0222625 A1* | 9/2011 | Clerckx | H04B 7/0626 375/295 |
| 2012/0026931 A1 | 2/2012 | Wentink | |
| 2012/0155358 A1 | 6/2012 | Hao et al. | |

(Continued)

FOREIGN PATENT DOCUMENTS

WO WO 2013/185110 A2 12/2013

OTHER PUBLICATIONS

Extended European Search Report dated Jul. 9, 2015 in corresponding European Patent Application No. 15154898.9 (7 pages in English).

*Primary Examiner* — Charles C Jiang
*Assistant Examiner* — Rose Clark
(74) *Attorney, Agent, or Firm* — NSIP Law

(57) ABSTRACT

A method and apparatus for transmitting and receiving content are provided. Content data is multicast from a transmitter to each of receivers. Cooperative receivers among the receivers provide data lost during the multicasting with each other through cooperative reception between the cooperative receivers.

22 Claims, 8 Drawing Sheets

(56) References Cited

U.S. PATENT DOCUMENTS

| | | | |
|---|---|---|---|
| 2013/0040578 A1* | 2/2013 | Khoshnevis | H04W 52/242 455/67.11 |
| 2013/0177048 A1* | 7/2013 | Yu | H04L 1/0076 375/211 |
| 2013/0235754 A1* | 9/2013 | Lim | H04W 72/042 370/252 |
| 2014/0022982 A1* | 1/2014 | Kim | H04L 1/0077 370/315 |
| 2014/0071841 A1* | 3/2014 | Hu | H04L 5/0035 370/252 |
| 2014/0254349 A1* | 9/2014 | Jia | H04W 28/04 370/225 |
| 2015/0131720 A1* | 5/2015 | Luo | H04L 12/189 375/240.12 |
| 2015/0195759 A1* | 7/2015 | Sirotkin | H04W 8/005 370/331 |

* cited by examiner

METHOD AND APPARATUS FOR COMMUNICATION

CROSS-REFERENCE TO RELATED APPLICATION(S)

This application claims the benefit under 35 USC 119(a) of Korean Patent Application No. 10-2014-0019096, filed on Feb. 19, 2014, in the Korean Intellectual Property Office, the entire disclosure of which is incorporated herein by reference for all purposes.

BACKGROUND

1. Field

The following description relates to a communication method and apparatus, and more particularly, to a method and apparatus to communicate through multicast.

2. Description of Related Art

A single transmission apparatus transmits content to a plurality of reception apparatuses using various transmission schemes, for example, a data sharing scheme based on multi-unicast, and a multicast scheme based on a minimum data rate.

In the data sharing scheme, a transmission apparatus divides radio resources, and allocates the divided radio resources to each of a plurality of reception apparatuses. The transmission apparatus transmits content to each of the reception apparatuses using the allocated radio resources. To transmit the same content to the reception apparatuses, each of the allocated radio resources may be used to transmit the content to a single reception apparatus.

Radio resources may be divided by, for example, at least one of time division, frequency division, and code division. The time division may be, for example, time division multiple access (TDMA). The frequency division may be, for example, frequency division multiple access (FDMA). The code division may be, for example, code division multiple access (CDMA).

In the multicast scheme, a transmission apparatus may simultaneously transmit, that is, multicast content to a plurality of reception apparatuses. To successfully receive the content, a data rate of each of the reception apparatuses may need to be adjusted. For example, the transmission apparatus may adjust a data rate to multicast the content to a minimum data rate among data rates of the reception apparatuses. However, when content is transmitted and played back in real time, a quality of content received by the reception apparatuses may be reduced due to a limit on a data rate.

When the above schemes are used, division of radio resources or a data rate, content transmission may have limitations, such as lower quality in content reception.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a method of a receiver, the method including receiving first data over multicast from a transmitter configured to transmit the content; acquiring second data through cooperative reception with another receiver; and generating content based on the first data and the second data.

The second data may be generated using network coding.

The first data may correspond to at least a portion of third data received at the receiver, the third data being multicast by the transmitter.

A data transmission rate for the third data may be equal to or higher than a data reception rate of the receiver.

The third data may be output at a data transmission rate that is lower than or equal to a sum of the data reception rate of the receiver and data reception rates of the other receiver.

A first network in which the multicast may be performed, and a second network in which the cooperative reception may be performed are different from each other.

The multicast and the cooperative reception may be performed through division of resources within a single network.

The method may also include forming a cooperation set for the cooperative reception.

The method may also include receiving an inquiry from the transmitter on whether to participate in the cooperative reception; and transmitting an answer to the inquiry to the transmitter.

Whether to participate in the cooperative reception may be determined based on at least one of a performance of the receiver, a type of a first network in which the first data is transmitted, a second network in which the second data is transmitted, a protocol supported by the receiver, a policy of the receiver, a capacity of a battery of the receiver, and a remaining capacity of the battery.

The method may also include receiving an additional information request for additional information used to form the cooperative set from the transmitter; and transmitting a response to the additional information request to the transmitter.

The method may also include generating low quality content based on the first data, wherein the generating of the content based on the first data and the second data comprises generating high quality content, and wherein a quality of the high quality content is greater than a quality of the low quality content.

In accordance with an illustrative example, there is provided a computer program embodied on a non-transitory computer readable medium, the computer program being configured to control a processor to perform the method described above.

In accordance with an illustrative example, there is provided an apparatus, including a communication unit configured to receive first data over multicast from a transmitter and acquire second data through cooperative reception with another receiver; and a processor configured to generate content based on the first data and the second data.

In accordance with an illustrative example, there is provided a method of a transmitter, including determining cooperative receivers participating in cooperative reception among receivers configured to receive content; and multicasting data of the content to each of the receivers.

A data transmission rate for the data may be equal to or greater than a maximum data reception rate among data reception rates of the cooperative receivers.

The method may also include transmitting an inquiry to each of the receivers on whether each of the receivers is to participate in the cooperative reception; and receiving an answer to the inquiry from each of the receivers.

The method may also include transmitting a request for additional information used to form a cooperative set to each of the cooperative receivers; receiving a response to the request from each of the cooperative receivers; forming information of the cooperative set based on the response; and transmitting the information of the cooperative set to each of the cooperative receivers.

In accordance with an illustrative example, there is provided a computer program embodied on a non-transitory computer readable medium, the computer program being configured to control a processor to perform the method described above.

In accordance with an illustrative example, there is provided an apparatus including a processing unit configured to determine cooperative receivers participating in cooperative reception among receivers configured to receive content; and a communication unit configured to multicast data of the content to each of the receivers.

In accordance with an illustrative example, there is provided a method of a receiver, including forming a cooperative reception with another receiver; receiving at least a portion of low quality data and high quality content data multicast from a transmitter; and generating content based on the received content data.

The method may also include acquiring at least a portion of the high quality data by subtracting restored low quality data from the received content data.

The method may also include receiving additional content data through the cooperative reception with other cooperative receivers, wherein the additional data comprises data lost.

The forming of the cooperative reception may be based on at least one of a performance of the receiver, a type of network in which content is transmitted, a type of network in which cooperative reception is performed, a protocol supported by the receiver, a policy of the receiver, a capacity of a battery of the receiver, and a remaining capacity of the battery.

The method may also include receiving at the receiver and the another receiver the content data at a data rate that is lower than or equal to a sum of data rates of the receiver and the another receiver based on cooperation therebetween.

The method may also include receiving at the receiver and the another receiver the content data at a data rate that is lower than or equal to a maximum data rate among data rates of the receiver and the another receiver based on cooperation therebetween.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
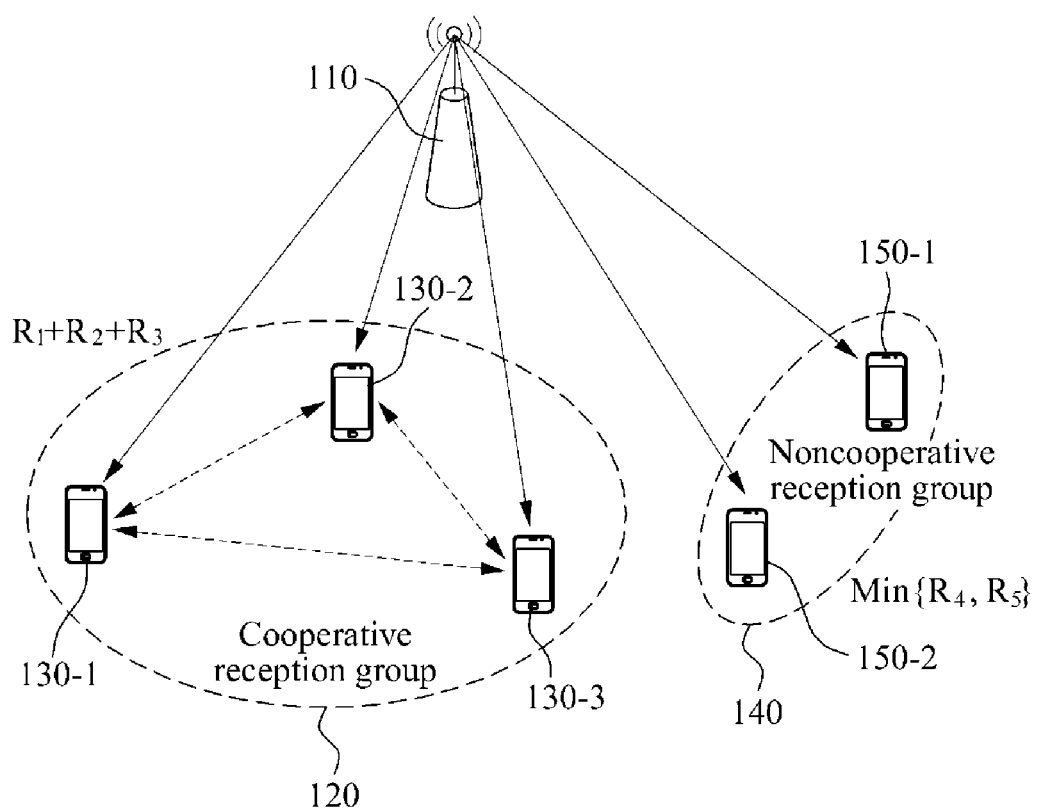
FIG. 1 is a diagram illustrating an example of a multicast scheme, in accord with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a multicast scheme, in accord with an embodiment.

Referring to FIG. 1, a network system 100 includes a transmitter or a transmission apparatus 110, and one or more receivers or reception apparatuses. The reception apparatuses may include, for example, a first reception apparatus 130-1, a second reception apparatus 130-2, a third reception apparatus 130-3, a fourth reception apparatus 150-1, and a fifth reception apparatus 150-2.

The transmission apparatus 110 is configured to transmit content. The transmission apparatus 110 transmits content to the reception apparatuses. Each of the reception apparatuses is configured to receive content.

In the following description, a quality of content actually received at a reception apparatus may be lower than or equal to a quality of content transmitted from a transmission apparatus. The transmission apparatus transmits content data to one or more reception apparatuses. Based on an amount of data from all data content successfully received at a reception apparatus, whether the reception apparatus receives the content may be determined, and a quality of content received at the reception apparatus may be determined. For example, when an amount of content data received at the reception apparatus increases, a quality of content generated at the reception apparatus increases. When the amount of the data received at the reception apparatus decreases, the quality of the content generated at the reception apparatus decreases.

A quality of high quality content is greater than a quality of low quality content, in terms of images, for example, a resolution, a frame rate, and a color-per-pixel, and in terms of sound, for example, a bit per second (BPS), and a number of channels.

In an example, when the amount of content data received at a reception apparatus is less than or equal to a predetermined first threshold, content may not be generated. When the amount of the data received at the reception apparatus is greater than the predetermined first threshold, lowest quality content is generated.

In another example, when the amount of content data received at a reception apparatus is less than or equal to a predetermined second threshold, the low quality content is generated. When the amount of the data received at the reception apparatus is greater than the predetermined second threshold, high quality content or content having a quality equal to that of original content transmitted by the transmission apparatus is generated.

Each of the reception apparatuses determines a participation level to participate in the transmission and receipt of content. Based on participation levels determined at the reception apparatuses, radio resources within the network system 100 may be efficiently used. Additionally, the transmission apparatus 110 may provide each of the reception apparatuses with content having a quality that is optimally adjusted to a cooperation level determined by each of the reception apparatuses.

The transmission apparatus 110 may multicast content to the reception apparatuses.

Each of the reception apparatuses receives content either cooperating with other reception apparatuses or without the cooperation of other reception apparatuses.

Reception apparatuses configured to receive content while cooperating with other reception apparatuses form a cooperative reception group 120. Reception apparatuses configured to receive content without cooperating with other reception apparatuses form a noncooperative reception group 140. Cooperative reception refers to additionally acquiring lost data among content data multicast by the transmission apparatus 110 through mutual cooperation between a plurality of reception apparatuses.

Referring to FIG. 1, the cooperative reception group 120 includes the first reception apparatus 130-1, the second reception apparatus 130-2, and the third reception apparatus 130-3. The noncooperative reception group 140 includes the fourth reception apparatus 150-1, and the fifth reception apparatus 150-2.

Each of the reception apparatuses forms a link with the transmission apparatus 110. The link between the transmission apparatus 110 and each of the reception apparatuses has a predetermined data rate. For example, a data transmission rate for transmission of content to each of the reception apparatuses is limited by a data rate of each of the reception apparatuses. Each of the reception apparatuses has a data rate in transmission of content. In FIG. 1, a data rate of each of the first reception apparatus 130-1, the second reception apparatus 130-2, the third reception apparatus 130-3, the fourth reception apparatus 150-1, and the fifth reception apparatus 150-2 are indicated by $R_1$, $R_2$, $R_3$, $R_4$, and $R_5$, respectively.

The reception apparatuses in the cooperative reception group 120 receive content by cooperating with each other. The reception apparatuses in the noncooperative reception group 140 individually receive content, instead of cooperating with each other. For example, reception apparatuses that desire to receive content through cooperation with each other may be included in the cooperative reception group 120. Additionally, a reception apparatus that does not desire to receive content through cooperation, or a reception apparatus that is incapable of cooperating with another reception apparatus may be included in the noncooperative reception group 140.

A data rate of the cooperative reception group 120 is determined based on cooperation between reception apparatuses in the cooperative reception group 120. The reception apparatuses in the cooperative reception group 120 receive content while cooperating with each other, at a data rate higher than a data rate of an individual reception apparatus. For example, the reception apparatuses in the cooperative reception group 120 receive content at a data rate that is lower than or equal to a sum of data rates of the reception apparatuses based on cooperation between the reception apparatuses. In another example, the reception apparatuses in the cooperative reception group 120 receive content at a data rate that is lower than or equal to a maximum data rate among data rates of the reception apparatuses based on cooperation between the reception apparatuses. Referring to FIG. 1, the data rate of the cooperative reception group 120 is lower than or equal to a sum of the data rates $R_1$, $R_2$ and $R_3$, or is lower than or equal to a value of $\text{Max}(R_1, R_2, R_3)$. In other words, the data rate of the cooperative reception group 120 as a whole is less than or equal to a sum of data rate of each of the first, second, and third reception apparatuses 130-1, 130-2, and 130-3, respectively. Max is a function to output a maximum value among provided input values.

A data rate of the noncooperative reception group 140 is determined based on each of data rates of reception apparatuses in the noncooperative reception group 140. For example, to ensure reception of content by each of all the reception apparatuses 150-1 and 150-2 in the noncooperative reception group 140, the data rate of the noncooperative reception group 140 is lower than or equal to a minimum data rate among data rates of the reception apparatuses 150-1 and 150-2 in the noncooperative reception group 140. Referring to FIG. 1, the data rate of the noncooperative reception group 140 is lower than or equal to a value of $\text{Min}(R_4, R_5)$. Min indicates a function to output a minimum value among provided input values.

The data rates of the reception apparatuses in the noncooperative reception group 140 are not further limited, compared to a typical multicast. In one example, a restriction on the data rates of the reception apparatuses in the cooperative reception group 120 is not applied to the reception apparatuses in the noncooperative reception group 140. Accordingly, the reception apparatuses in the noncooperative reception group 140 also receive provided content at a higher data rate, compared to a typical multicast, depending on circumstances.

By the above-described scheme, voluntary cooperation between reception apparatuses is induced, and a multicast transmission capacity of the network system 100 is significantly enhanced. Additionally, reception apparatuses that participate in cooperative reception are differentiated from reception apparatuses that do not participate in the cooperative reception, and a differentiated multicast service is provided. The differentiation may be, for example, differentiation of a Quality of Service (QoS). The differentiated multicast service is performed based on single transmission using the same resource. By the differentiated multicast service, an efficiency of using radio resources may be enhanced, and a high-quality multicast service is provided.

Hereinafter, cooperation between reception apparatuses will be further described with reference to FIGS. 2 through 8.

Figure 2:
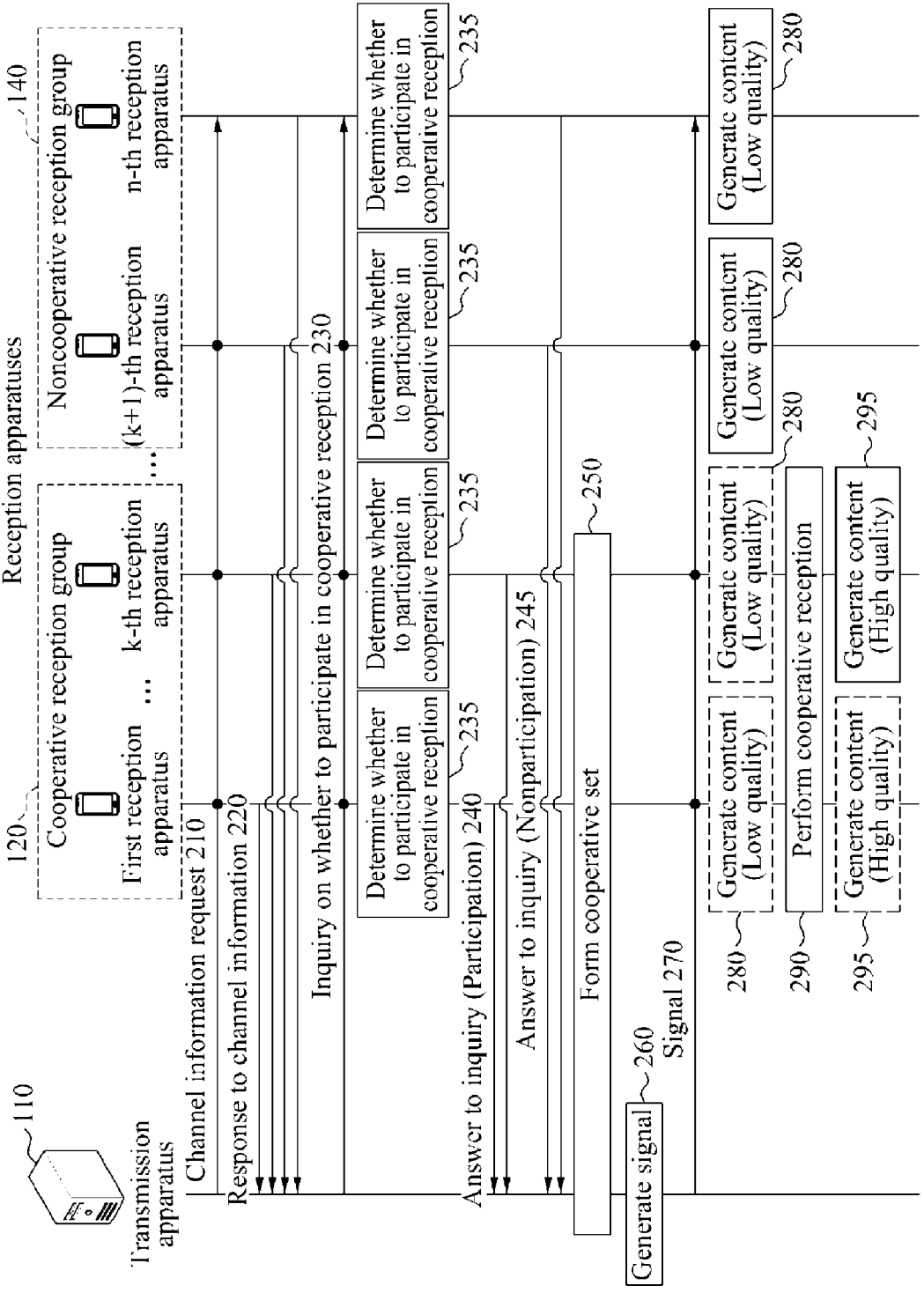
FIG. 2 is a flowchart illustrating an example of a system and a method for multicasting content, in accord with an embodiment.

FIG. 2 illustrates an example of a system and a method for multicasting content, in accord with an embodiment.

Referring to FIG. 2, the system includes the transmission apparatus 110 of FIG. 1, and one or more reception apparatuses, for example, "n" reception apparatuses. Operations 210 to 295 performed between the structural devices in the system including, but not limited to, the transmission apparatus 110, the cooperative reception group 120, and the noncooperative reception group 140 illustrated in FIG. 2 are described hereinbelow.

The reception apparatuses are classified into the cooperative reception group 120 and the noncooperative reception group 140, as described above with reference to FIG. 1. The cooperative reception group 120 includes a first reception apparatus to a k-th reception apparatus, and the noncooperative reception group 140 includes a (k+1)-th reception apparatus to an n-th reception apparatus.

In operation 210, the transmission apparatus 110 transmits a channel information request to each of the reception apparatuses.

The channel information request includes, for example, a message requesting channel information.

In one configuration, each of the reception apparatuses receives the channel information request from the transmission apparatus 110. In another configuration, each of the reception apparatuses in the noncooperative reception group 140 receives the channel information request from the transmission apparatus 110 and one of the reception apparatuses in the cooperative reception group 120 receives the channel information request, which is then communicated to other reception apparatuses in the cooperative reception group 120.

Channel information of each of the reception apparatuses is used to establish and maintain a link in a network between the transmission apparatus 110 and each of the reception apparatuses.

In operation 220, each of the reception apparatuses transmits a response to the channel information to the transmission apparatus 110.

The response to the channel information may be, for example, a response to the channel information request transmitted in operation 210, or feedback provided in response to the channel information request.

The transmission apparatus 110 receives the response to the channel information request from each of the reception apparatuses. In an alternative configuration, the transmission apparatus 110 receives the response to the channel information request from each of the reception apparatuses in the noncooperative reception unit 140 and from one of the reception apparatuses of the cooperative reception group 120. The response from the one of the reception apparatuses is an indication that all of the reception apparatuses in the cooperative reception group 120 authorize a transmission of the response to the channel information request.

In operation 230, the transmission apparatus 110 transmits an inquiry on whether each of the reception apparatuses is to participate in a cooperative reception to each of the reception apparatuses.

Each of the reception apparatuses receives the inquiry from the transmission apparatus 110. In an alternative configuration, each of the reception apparatuses in the noncooperative reception unit 140 receives the inquiry and the one of the reception apparatuses of the cooperative reception group 120 receives the inquiry, which is then communicated to other reception apparatuses in the cooperative reception group 120.

In operation 235, each of the reception apparatuses determines whether to participate in the cooperative reception.

In FIG. 2, the first reception apparatus to the k-th reception apparatus are included in the cooperative reception group 120. For example, the first reception apparatus to the k-th reception apparatus determine to participate in the cooperative reception. The first reception apparatus to the k-th reception apparatus correspond to reception apparatuses that determine to participate in the cooperative reception among the reception apparatuses. In one illustrative example, reception apparatuses that determine to participate in the cooperative reception among the reception apparatuses are referred to as "cooperative reception apparatuses." For example, each of the cooperative reception apparatuses transmits an answer indicating participation in the cooperative reception.

The (k+1)-th reception apparatus to the n-th reception apparatus are included in the noncooperative reception group 140. For example, the (k+1)-th reception apparatus to the n-th reception apparatus determine not to participate in the cooperative reception. The (k+1)-th reception apparatus to the n-th reception apparatus correspond to reception apparatuses that determine not to participate in the cooperative reception among the reception apparatuses. In accordance with an illustrative example, reception apparatuses that determine not to participate in the cooperative reception among the reception apparatuses may be referred to "noncooperative reception apparatuses."

Whether each of the reception apparatus is to participate in the cooperative reception may be determined based on various criteria. For example, each of the reception apparatuses determines whether to participate in the cooperative reception, based on at least one of a performance of each of the reception apparatuses, a type of a network in which content is transmitted, a type of a network in which the cooperative reception is performed, a protocol supported by each of the reception apparatuses, a policy of each of the reception apparatuses, a capacity of a battery of each of the reception apparatuses, and a remaining capacity of the battery.

In operation 240, each of the cooperative reception apparatuses transmits an answer to the inquiry to the transmission apparatus 110. In this illustrative example, the cooperative reception apparatus includes the first reception apparatus through the k-th reception apparatus in the cooperative reception group 120. The answer transmitted in operation 240 indicates participation in the cooperative reception.

In operation 245, each of the noncooperative reception apparatuses transmits an answer to the inquiry to the transmission apparatus 110. In this illustrative example, the noncooperative reception apparatus includes each of the reception apparatuses in the noncooperative reception group 140. The answer transmitted in operation 245 indicates nonparticipation in the cooperative reception.

In operations 240 and 245, the transmission apparatus 110 receives the answer from each of the reception apparatuses. For example, based on answers received from the reception apparatuses, the transmission apparatus 110 classifies one or more reception apparatuses into the cooperative reception group 120 and the noncooperative reception group 140.

In response to the transmission apparatus 110 receiving the answer from each of the reception apparatuses in operation 245, the reception apparatuses are classified into the cooperative reception group 120 and the noncooperative reception group 140. The transmission apparatus 110 determines cooperative reception apparatuses that participate in the cooperative reception among the reception apparatuses configured to receive content.

In operation 250, the transmission apparatus 110 and the cooperative reception group 120 form a cooperative set.

The transmission apparatus 110 requests the cooperative reception apparatuses to form a cooperative set.

Each of the cooperative reception apparatuses forms a cooperative set for cooperative reception with one or more other reception apparatuses in the cooperative reception group 120. The transmission apparatus 110 performs an operation required to form a cooperative set.

An example of forming a cooperative set will be further described with reference to FIG. 3.

In operation 260, the transmission apparatus 110 generates a signal to be transmitted to each of the reception apparatuses.

The signal is, for example, a digital signal generated by modulation.

A content signal is content data that the transmission apparatus 110 desires to transmit to the reception apparatuses.

In operation 270, the transmission apparatus 110 transmits the signal to the reception apparatuses.

For example, the transmission apparatus 110 is configured to multicast content data to each of the reception apparatuses. Each of the reception apparatuses receives the multicast data.

The transmission apparatus 110 outputs, for example, content data included in the transmission apparatus 110 or content data accessible by the transmission apparatus 110.

In one example, in wireless communication, a signal actually received at each of the reception apparatuses may differ from a signal output from the transmission apparatus 110. In this example, a portion of the content data transmitted from the transmission apparatus 110 may be lost. Each of the reception apparatuses receives the content data, where the content data actually received by each of the reception apparatuses may differ from the content data output from the transmission apparatus 110. Additionally, the content data received by each of the reception apparatuses may be different from each other.

For example, each of the reception apparatuses may receive at least a portion of content data multicast by the transmission apparatus 110.

Through the cooperative reception that will be described, each of the cooperative reception apparatuses may acquire a portion of or all of the lost content data, and may restore the lost data. For example, each of the cooperative reception apparatuses restores data lost in operation 270 through the cooperative reception, and acquires content having the same quality as that of content provided by the transmission apparatus 110. A data transmission rate of the transmission apparatus 110 may refer to a maximum amount of the content data that may be output per unit time by the transmission apparatus 110. A data reception rate of each of the reception apparatuses may refer to a maximum amount of the content data that may be received per unit time by each of the reception apparatuses.

When cooperative reception is utilized, the data transmission rate of the transmission apparatus 110 may be equal to or greater than a data reception rate of each of the reception apparatuses. When the data transmission rate of the transmission apparatus 110 is equal to or greater than a data reception rate of a reception apparatus, the reception apparatus may not completely receive the content data, and a portion of the data may be lost. When a portion of the content data output by the transmission apparatus 110 is lost, a cooperative reception apparatus replenishes the lost data through cooperative reception, and a noncooperative reception apparatus restores the content based on data other than the lost data.

The data transmission rate of the transmission apparatus 110 may be determined based on various criteria. For example, a data transmission rate for data output from the transmission apparatus 110 may be equal to or greater than a maximum reception rate among data reception rates of cooperative reception apparatuses, or may be less than or equal to a sum of the data reception rates of the cooperative reception apparatuses.

Cooperative reception apparatuses may form a cooperative set and receive content data based on a performance close to a sum of data rates of links of the cooperative reception apparatuses. Noncooperative reception apparatuses may receive content data based on a performance equal to an existing multicast service. Based on the above characteristics, voluntary cooperative reception between the reception apparatuses may be induced, and a multicast transmission capacity may be enhanced through cooperative reception.

In operation 270, multicast is performed in a network between the transmission apparatus 110 and the reception apparatuses. In operation 290, cooperative reception is performed in a network between cooperative reception apparatuses in the cooperative reception group 120. The network in which the multicast is performed may differ from the network in which the cooperative reception is performed. For example, the multicast may be performed in a broadband network, for example a cellular network, and the cooperative reception may be performed in a local network, for example, wireless fidelity (Wi-Fi). Different networks may be used and; accordingly, all bandwidths of a network for cooperative reception may be utilized.

In an example, multicast and cooperative reception is performed in a single network. The multicast and cooperative reception is performed through division of resources, for example radio resources, within a single network. Radio resources are divided by at least one of time division, frequency division, and code division. For example, multicast and cooperative reception may be performed within cellular networks in which bandwidths are divided. Frequency division may be performed for each of an up link and a down link.

In operation 280, each of the reception apparatuses generates content based on received content data. Based on the receive data, each of the reception apparatuses restores content transmitted by the transmission apparatus 110.

As described above, in operation 270, a portion of content data received by both, the cooperative reception apparatus and the noncooperative reception apparatus, may be lost compared with the content data output from the transmission apparatus 110. Due to the lost data, content having a quality equal to that of the content of the transmission apparatus 110 may not be restored. Each of the reception apparatuses may restore low quality content based on the received data.

The low quality content may be content having a lower quality than content output from the transmission apparatus 110. The high quality content may be content having the same quality as that of content output from the transmission apparatus 110. The high quality content may have a higher quality than the low quality content.

Operation 280 is optionally performed. Each of the cooperative reception apparatuses may restore high quality content in operation 295, which will be described below and, accordingly, low quality content may not be restored.

In operation 290, the cooperative reception apparatuses perform cooperative reception.

Each of the cooperative reception apparatuses receives additional content data through cooperative reception with the other cooperative reception apparatuses. The additional data may include the data lost in operation 270.

The additional data may be multicast.

Additionally, each of the cooperative reception apparatuses transmits data required by another cooperative reception apparatus. The transmitting indicates cooperative reception in terms of the other cooperative reception apparatus. The data required by the other cooperative reception apparatus includes data lost at the other cooperative reception apparatus in operation 270.

Cooperative reception apparatuses perform cooperative reception using various cooperative transceiving schemes. Each of the cooperative reception apparatuses may generate additional data using network coding. The network coding include, for example, random linear network coding, matrix network coding, physical-layer network coding, analog network coding, and noisy network coding.

The additional data may be transmitted as one or more packets generated using the network coding. Due to characteristics of the network coding, when data is encoded at the network coding, all packets generated as a result of the encoding may not be acquired; however, data may be recovered based on a portion of the packets. Each of the cooperative reception apparatuses may completely restore the additional data used to generate the packets, even when a portion of the one or more packets generated using the network coding is not received. Accordingly, each of the cooperative reception apparatuses is configured to effectively acquire additional data, sufficient to restore high quality content.

In operation 295, each of the cooperative reception apparatuses generates content. For example, each of the cooperative reception apparatuses may generate high quality content based on additional data and content data. The data of the content is data transmitted from the transmission apparatus 110 in operation 270. The additional data of the content is data received through the cooperative reception performed in operation 290. Operation 295 is optionally performed.

The high quality content includes the same data as that of content used to generate the signal by the transmission apparatus 110 in operation 260. A quality of the high quality content may be equal to a quality of the content used in operation 260.

Figure 3:
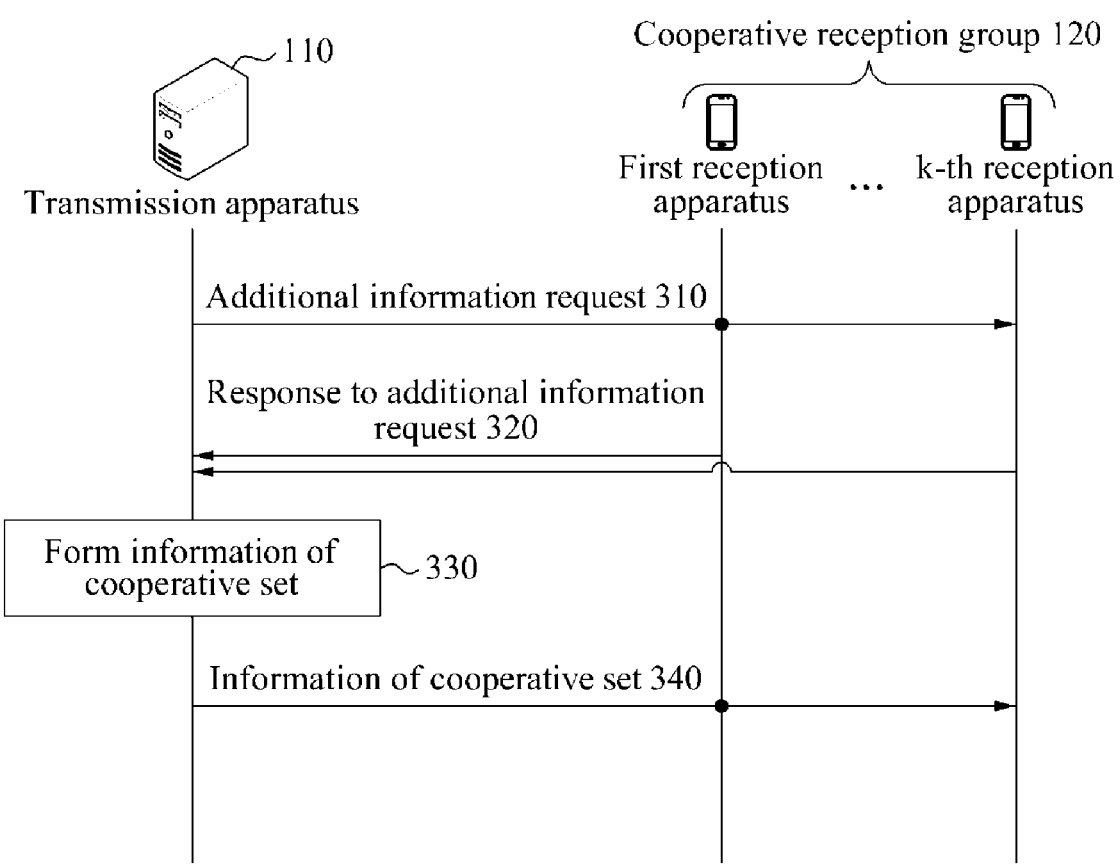
FIG. 3 is a flowchart illustrating an example of forming a cooperative set, in accord with an embodiment.

FIG. 3 illustrates an example of forming a cooperative set, in accord with an embodiment.

Operation 250 of FIG. 2 includes operations 310 to 340 that will be described below.

In operations 310 to 340, the transmission apparatus 110 and the cooperative reception apparatuses may communicate with each other. The cooperative reception apparatuses refer to reception apparatuses that transmit an answer indicating participation in cooperative reception among the reception apparatuses of FIG. 2.

Referring to FIG. 3, in operation 310, the transmission apparatus 110 transmits to each of the cooperative reception apparatuses an additional information request for additional information required to form information of a cooperative set.

Each of the cooperative reception apparatuses receive the additional information request from the transmission apparatus 110.

The additional information is information required to form a cooperative set. The additional information may include, for example, information about a channel, information about a cooperative level, information about a topology, and a system parameter associated with cooperative reception. The topology may be, for example, a topology of a link between a plurality of cooperative reception apparatuses in a cooperative set.

The additional information may be, for example, information required by a plurality of cooperative reception apparatuses to perform network coding.

In operation 320, each of the cooperative reception apparatuses transmits a response to the additional information request to the transmission apparatus 110.

The transmission apparatus 110 receives the response to the additional information request from each of the cooperative reception apparatuses.

Each of the cooperative reception apparatuses transmits the additional information to the transmission apparatus 110 individually, or through a head reception apparatus. The head reception apparatus refers to an apparatus configured to provide exchange information between the transmission apparatus 110 and the cooperative reception apparatuses.

In operation 330, based on the response to the additional information request, the transmission apparatus 110 forms the information of the cooperative set.

The information of the cooperative set may include, for example, information indicating a cooperative transceiving scheme to be used for cooperative reception. The transmission apparatus 110 determines an optimum network coding scheme among a plurality of network coding schemes based on the response to the additional information request. For example, the transmission apparatus 110 selects a cooperative transceiving scheme or a network coding scheme based on system information of the cooperative reception apparatuses that is received as the response to the additional information request.

In operation 340, the transmission apparatus 110 transmits the determined network coding scheme as the information of the cooperative set to each of the cooperative reception apparatuses. For example, a protocol of cooperative reception may be determined by the transmission apparatus 110.

Each of the cooperative reception apparatuses may store, in advance, a protocol of each of the cooperative transceiving scheme and the network coding scheme. For example, when a protocol of each of the cooperative transceiving scheme and the network coding scheme is stored in advance in a cooperative reception apparatus, the information of the cooperative set may include an index or an identifier (ID) of each of the cooperative transceiving scheme and the network coding scheme.

Additionally, the information of the cooperative set may include, for example, data of a protocol of each of the cooperative transceiving scheme and the network coding scheme. For example, the transmission apparatus 110 provides each of the cooperative reception apparatuses with data of a protocol to be used for cooperative reception. The data of the protocol may include a code, a configuration option, and a modulation option of the protocol. The code of the protocol may be a new code or an additional code in contrast with a code that is stored in advance in a cooperative reception apparatus.

In operation 340, the transmission apparatus 110 transmits the information of the cooperative set to each of the cooperative reception apparatuses.

Each of the cooperative reception apparatus receives the information of the cooperative set from the transmission apparatus 110.

The information of the cooperative set is provided through the head reception apparatus. For example, the transmission apparatus 110 transmits the information of the cooperative set to the head reception apparatus, and the head reception apparatus transfers the information of the cooperative set to the other cooperative reception apparatuses.

Through operations 310 to 340, the cooperative reception apparatuses acquire information required to form a cooperative set, and form the cooperative set based on the information.

Figure 4:
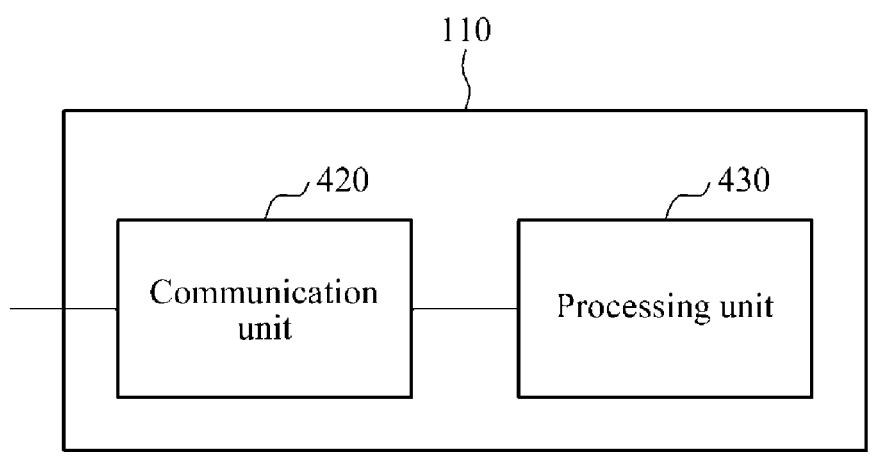
FIG. 4 is a block diagram illustrating an example of a transmission apparatus, in accord with an embodiment.

FIG. 4 illustrates a configuration of the transmission apparatus 110 of FIG. 1, in accord with an embodiment.

Referring to FIG. 4, the transmission apparatus 110 includes a communication unit 420, and a processing unit 430.

The communication unit 420 receives and transmits a signal from and to another communication apparatus. The signal includes data or information.

The processing unit 430 processes the data or the information.

Hereinafter, an example of each of functions of the communication unit 420 and the processing unit 430 will be further described with reference to FIG. 5.

Figure 5:
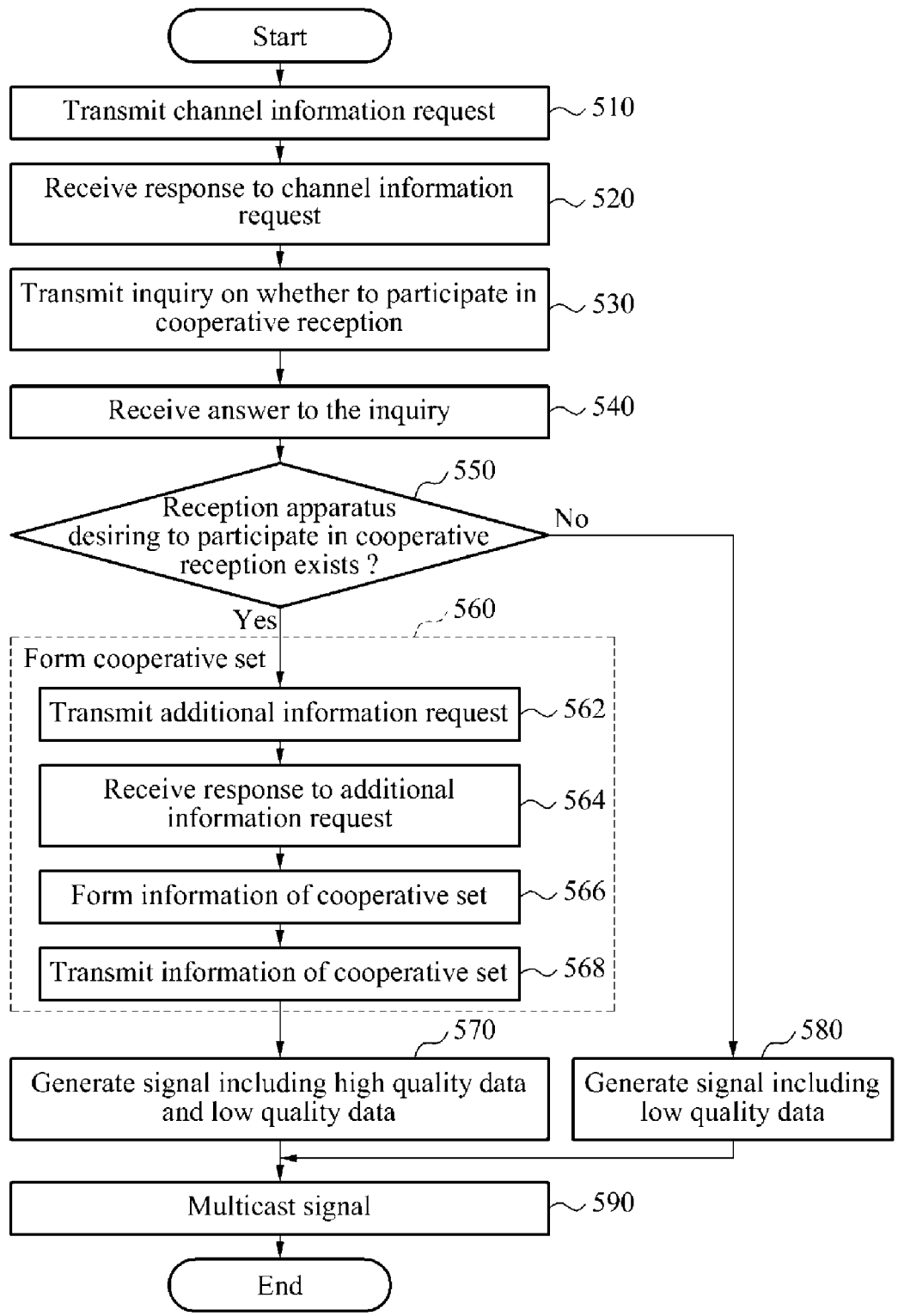
FIG. 5 is a flowchart illustrating an example of a communication method of a transmission apparatus, in accord with an embodiment.

FIG. 5 illustrates a communication method of the transmission apparatus 110, in accord with an embodiment.

The example of FIG. 2 is further described in terms of the transmission apparatus 110 with reference to operations 510 to 590 of FIG. 5.

Referring to FIG. 5, in operation 510, the method transmits, through the communication unit 420 of the transmission apparatus 110, a channel information request for channel information to each of one or more receivers or reception apparatuses.

In operation 520, the method receives, through the communication unit 420, a response to the channel information request from each of the reception apparatuses.

The response to the channel information request may include, for example, channel information of each of the reception apparatuses.

In operation 530, the method at the communication unit 420 transmits, to each of the reception apparatuses, an inquiry about whether each of the reception apparatuses is to participate in cooperative reception.

In operation 540, the method at the communication unit 420 receives an answer to the inquiry from each of the reception apparatuses.

In operation 550, the method determines, through the processing unit 430 of the transmission apparatus 110 and based on the received answer, whether a reception apparatus that desires to participate in the cooperative reception exists among the reception apparatuses, based on the received answer.

In an example in which the reception apparatus that desires to participate in the cooperative reception exists, the method proceeds to operations 560 and 570. In another example in which the reception apparatus that desires to participate in the cooperative reception does not exist, the method proceeds to operation 580.

In operation 560, the method uses the communication unit 420 and the processing unit 430 to form a cooperative set with the cooperative reception group 120 that desires to participate in the cooperative reception.

Operation 560 may include operations 562, 564, 566, and 568.

In operation 562, the method at the communication unit 420 transmits an additional information request for additional information required to form information of the cooperative set to each of cooperative reception apparatuses in the cooperative reception group 120.

In operation 564, the method receives through the communication unit 420 a response to the additional information request from each of the cooperative reception apparatuses.

In operation 566, the method at the processing unit 430 forms the information of the cooperative set based on the response to the additional information request.

In operation 568, the method at the communication unit 420 transmits the information of the cooperative set to each of the cooperative reception apparatuses.

For example, at operation 570, in response to a plurality of cooperative reception apparatuses existing, the method at the processing unit 430 generates a signal including low quality data and high quality content data.

The signal may be, for example, a signal that enables high quality data and low quality content data to be simultaneously transmitted, that is, multicast. The method at the processing unit 430 generates a signal including low quality data and high quality content data, using a superposition coding scheme, or a rate splitting scheme.

Operation 570 may be performed when cooperative reception apparatuses, which perform cooperative reception, exist among the reception apparatuses. Accordingly, each of the cooperative reception apparatuses acquire lost content data through cooperative reception with another cooperative reception apparatus, even when the data transmission rate of the transmission apparatus 110 is higher than a data reception rate of each of the cooperative reception apparatuses.

The low quality data of the content is data required by a cooperative reception apparatus or a noncooperative reception apparatus to generate low quality content. For example, the low quality data of the content is basic data required to generate content. The high quality data of the content is required by a cooperative reception apparatus to generate high quality content. For example, the high quality data is selective data that may be used to generate content, or data required together with low quality data to generate high quality content.

The low quality data includes an amount of data required by a reception apparatus to generate content. The high quality data may be data additionally required by the reception apparatus to generate high quality content.

For example, when high quality data is additionally acquired, the reception apparatus generates content having a higher quality.

The low quality data may include information that is recoverable in all of the reception apparatuses, under overall noise including additive white Gaussian noise (AWGN), and interference caused by high quality data. A low quality version of content includes data or information that is recoverable in all of the reception apparatuses, despite noise caused by information on a high quality version of content.

In an example, a data reception rate of each of the cooperative reception apparatuses for content data output from the transmission apparatus 110 may be sufficient to receive low quality data. However, the data reception rate may be insufficient to receive both the low quality data and high quality data. Through cooperative reception, the cooperative reception apparatuses acquire data that is lost in multicast by the transmission apparatus 110. Accordingly, the transmission apparatus 110 outputs content data at a data transmission rate that is equal to or higher than a data reception rate of each of the cooperative reception apparatuses, and generates a signal including low quality data and high quality content data.

Because a noncooperative reception apparatus may not restore or acquire data that is lost in multicast, the noncooperative reception apparatus may generate low quality content instead of high quality content, despite high quality data being output from the transmission apparatus 110.

When a cooperative reception apparatus does not exist, for example, when all the reception apparatuses function as noncooperative reception apparatuses, the processing unit 430 may generate a signal including low quality content data in operation 580.

Operation 590 is performed when a cooperative reception apparatus that determines to perform cooperative reception exists among the reception apparatuses. For example, when the cooperative reception is not performed, a data reception rate of each of the reception apparatuses may be insufficient to receive a signal including low quality data and high quality data. Accordingly, all the reception apparatuses may not generate high quality content, even when the transmission apparatus 110 outputs high quality data. The processing unit 430 may generate a signal including low quality content data.

The low quality data of the content refers to data received by each of the reception apparatuses without the cooperative reception. For example, the low quality data corresponds to a maximum value or a minimum value among values of data reception rates of the reception apparatuses.

In operation 590, the method multicasts the signal through the transmission apparatus 110 and transmits the multicast signal to the reception apparatuses.

For example, the signal generated in operation 570 or 580 is multicast in operation 590.

The above-description of FIGS. 1 through 4 is equally applicable to the example of FIG. 5. For example, operations 210, 220, 230, 250, 310, 320, 330, 340, and 270 may correspond to operations 510, 520, 530, 560, 562, 564, 566, 568, and 590, respectively. Additionally, operations 240 and 245 may correspond to operation 540, and operation 260 may correspond to operations 570 and 580. Accordingly, further description of the example of FIG. 5 is omitted herein.

Figure 6:
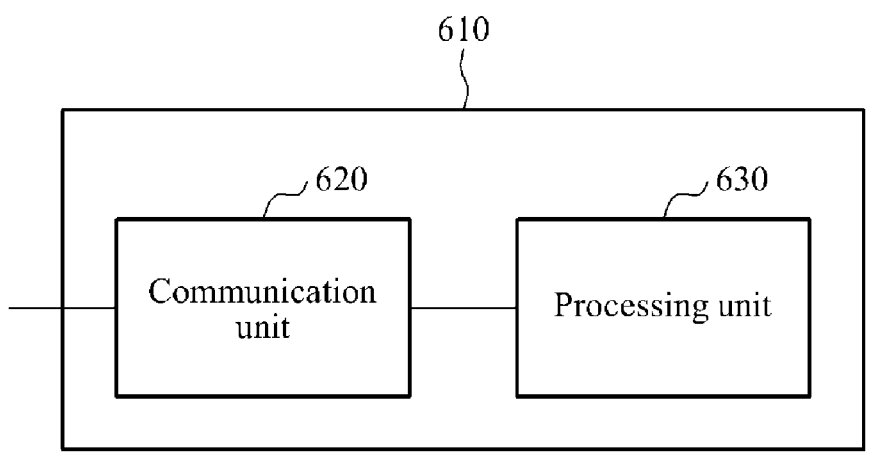
FIG. 6 is a block diagram illustrating an example of a reception apparatus, in accord with an embodiment.

FIG. 6 illustrates a configuration of a reception apparatus 610, in accord with an embodiment.

The reception apparatus 610 may be one of the reception apparatuses of FIGS. 1 through 5. For example, the reception apparatus 610 may correspond to each of one or more reception apparatuses.

Referring to FIG. 6, the reception apparatus 610 includes a communication unit 620, and a processing unit 630.

The communication unit 620 receives and transmits a signal from and to another communication apparatus. The signal may be, for example, data or information.

The processing unit 630 processes data or information.

The transmission apparatus 110 and the reception apparatus 610 may be communication apparatuses. For example, the transmission apparatus 110 is a communication apparatus configured to transmit content, and the reception apparatus 610 is a communication apparatus configured to receive content.

The communication unit 620 and the processing unit 630 correspond to the communication unit 420 and the processing unit 430 of the transmission apparatus 110, respectively.

Hereinafter, an example of each of functions of the communication unit 620 and the processing unit 630 will be further described with reference to FIG. 7.

Figure 7:
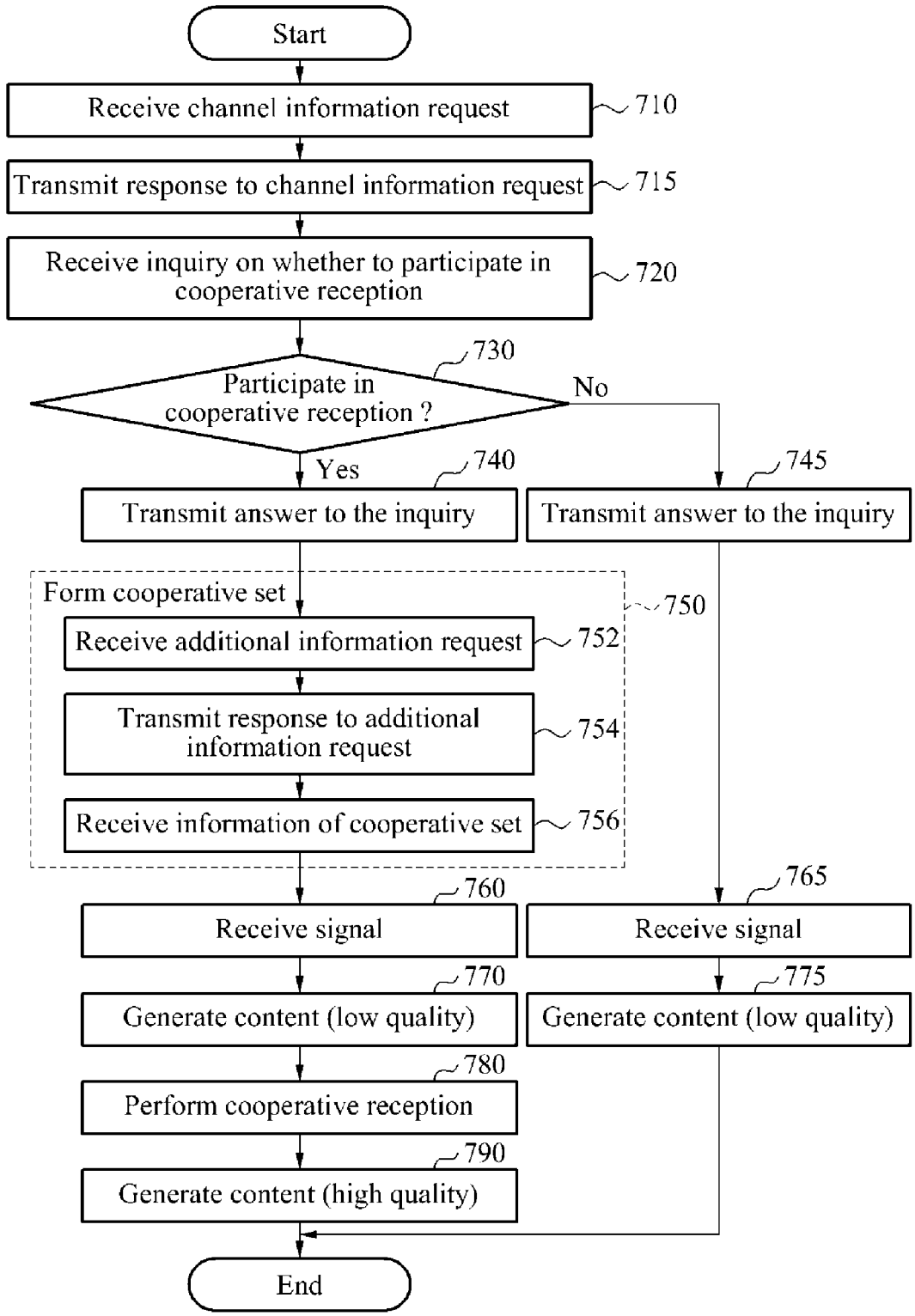
FIG. 7 is a flowchart illustrating an example of a communication method of a reception apparatus, in accord with an embodiment.

FIG. 7 illustrates a communication method of the reception apparatus 610 of FIG. 6, in accord with an embodiment.

The example of FIG. 2 is further described in terms of the reception apparatus 610 with reference to operations 710 to 790 of FIG. 7. Additionally, the communication method of FIG. 7 may correspond to the communication method of FIG. 5.

Referring to FIG. 7, in operation 710, the method, through the communication unit 620 of the reception apparatus 610, receives a channel information request for channel information from the transmission apparatus 110.

In operation 715, the method transmits from the communication unit 620 to the transmission apparatus 110 a response to the channel information request.

The response to the channel information request may include, for example, channel information associated with or corresponding to each of available reception apparatuses.

In operation 720, the method receives at the communication unit 620 an inquiry, from the transmission apparatus 110, on whether to participate in a cooperative reception.

In operation 730, the method determines, through the processing unit 630 of the reception apparatus 610, whether to participate in the cooperative reception.

Whether to participate in the cooperative reception is determined based on various criteria. For example, the method determines through the processing unit 630 whether to participate in the cooperative reception, based on at least one of a performance of the reception apparatus 610, a type of a network in which content is transmitted, a type of a network in which cooperative reception is performed, a protocol supported by the reception apparatus 610, a policy of the reception apparatus 610, a capacity of a battery of the reception apparatus 610, and a remaining capacity of the battery.

In an example in which the processing unit 630 determines to participate in or form the cooperative reception, operations 740, 750, 760, 770, 780 and 790 may be performed. In this example, the reception apparatus 610 performs a function of a cooperative reception apparatus described above with reference to FIGS. 1 through 5.

In another example in which the processing unit 630 determines not to participate in the cooperative reception, operations 745, 765 and 775 may be performed. In this example, the reception apparatus 610 performs a function of a noncooperative reception apparatus described above with reference to FIGS. 1 through 5.

Hereinafter, an example in which the reception apparatus 610 functions as a cooperative reception apparatus is described.

In operation 740, the method transmits through the communication unit 620 an answer to the inquiry to the transmission apparatus 110.

The answer transmitted in operation 740 may indicate participation in the cooperative reception.

In operation 750, the method configures the communication unit 620 and the processing unit 630 to form a cooperative set with the cooperative reception group 120 that desires to participate in the cooperative reception.

Operation 750 includes operations 752, 754, and 756.

In operation 752, the method receives at the communication unit 620 an additional information request for additional information of the cooperative set from the transmission apparatus 110.

In operation 754, the method transmits through the communication unit 620 a response to the additional information request to the transmission apparatus 110.

In operation 756, the method receives at the communication unit 620 the additional information of the cooperative set from the transmission apparatus 110.

In operation 760, the method receives at the communication unit 620 a signal from the transmission apparatus 110.

In addition to the reception apparatus 610, a plurality of reception apparatuses may function as cooperative reception apparatuses. Accordingly, a signal output from the transmission apparatus 110 may include low quality data and high quality content data.

The transmission apparatus 110 may output, for example, content data included in the transmission apparatus 110 or content data accessible through the transmission apparatus 110.

For example, when a signal is received via wireless communication, a signal actually received by the communication unit 620 may differ from a signal output by the transmission apparatus 110. In this example, a portion of content data transmitted by the transmission apparatus 110 is lost. The communication unit 620 receives the data of the content, and the data actually received by the communication unit 620 may differ from the data of the content output from the transmission apparatus 110. Additionally, content data received by each of the reception apparatuses including the reception apparatus 610 may be different from each other.

The communication unit 620 receives at least a portion of low quality data and high quality content data multicast by the transmission apparatus 110.

Through the cooperative reception that will be described, the communication unit 620 acquires a portion of or all of lost content data and the processing unit 630 restores the lost data. For example, the processing unit 630 restores data lost in operation 760 through the cooperative reception, and acquires content having the same quality as that of content provided by the transmission apparatus 110.

In operation 770, the method generates through the processing unit 630 content based on received content data.

The processing unit 630 restores the content transmitted from the transmission apparatus 110 based on the received data.

A portion of the received data may be lost, compared to the data of the content output by the transmission apparatus 110. Due to the lost data, high quality content, having a quality equal to that of the content of the transmission apparatus 110, may not be restored. Accordingly, the processing unit 630 restores low quality content based on the received data.

The processing unit 630 may optionally perform operation 770. Because the reception apparatus 610 functions as a cooperative reception apparatus, high quality content may be restored in operation 790. Accordingly, restoring of low quality content may not be performed.

The processing unit 630 restores low quality content data based on the received data. For example, the processing unit 630 restores information on a low quality version of the content based on the received signal.

The processing unit 630 acquires a portion of or all of high quality data by subtracting restored low quality data from the received data. For example, the processing unit 630 acquires a signal corresponding to information on a high quality version by subtracting a signal corresponding to the restored information on the low quality version from the received signal.

A signal corresponding to the information on the high quality version or the acquired high quality data may be used to generate additional data in operation 780, to be later described.

For example, cooperative reception apparatuses exchange high quality content data as additional data with each other through cooperative reception, based on the signal received in operation 760. The high quality data is received by each of the cooperative reception apparatuses from the transmission apparatus 110. To enhance an efficiency, a throughput, and a reliability during the exchanging, the additional data is transmitted and received as a network coding packet to which network coding is applied between the cooperative reception apparatuses. Through the exchanging, the cooperative reception apparatuses acquire additional data sufficient to generate high quality content.

In operation 780, the method at the communication unit 620 and the processing unit 630 performs the cooperative reception with the other cooperative reception apparatuses.

The communication unit 620 receives additional content data through the cooperative reception with the other cooperative reception apparatuses. The additional data may include the data lost in operation 760.

In the cooperative reception, the processing unit 630 applies network coding to a signal corresponding to information on a high quality version or high quality data generated in operation 790, and generates additional data to be transmitted to another cooperative reception apparatus.

In operation 790, the method of the processing unit 630 generates content.

The processing unit 630 generates high quality content based on the data and additional data of the content. The additional data may be, for example, high quality content data provided from another cooperative reception apparatus through the cooperative reception. For example, the processing unit 630 restores a portion of high quality data lack in a signal actually received by the communication unit 620, based on additional data provided from another cooperative reception apparatus through the cooperative reception. Through the restoring, high quality data sufficient to generate high quality content is acquired.

The processing unit 630 decodes high quality data and low quality data to acquire high quality content. The data of the content may be data transmitted from the transmission apparatus 110 in operation 760. The additional data of the content may be data received through the cooperative reception in operation 780.

The high quality content includes, for example, content including the same data as that of content used by the transmission apparatus 110 to generate the signal in operation 570 of FIG. 5, or content having the same quality as that of the content used in operation 570 of FIG. 5.

Hereinafter, an example in which the reception apparatus 610 functions as a noncooperative reception apparatus will be described.

In operation 745, the method transmits through the communication unit 620 an answer to the inquiry to the transmission apparatus 110.

The answer transmitted in operation 745 indicates nonparticipation in the cooperative reception.

In operation 765, the method receives at the communication unit 620 a signal from the transmission apparatus 110.

Because the reception apparatus 610 is used as a noncooperative reception apparatus, a cooperative reception apparatus may exist or not exist among one or more reception apparatuses. Accordingly, the transmission apparatus 110 outputs the signal generated in operation 570 or 580 of FIG. 5.

For example, when a signal is received via wireless communication, a signal received at the communication unit 620 may differ from a signal output from the transmission apparatus 110. In this example, a portion of content data transmitted by the transmission apparatus 110 may be lost. The communication unit 620 may receive the data of the content, and the data actually received by the communication unit 620 may differ from the data of the content output by the transmission apparatus 110. Additionally, content data received by each of the reception apparatuses including the reception apparatus 610 may be different from each other.

For example, the communication unit 620 receives at least a portion of the low quality data and high quality data of the content multicast at the transmission apparatus 110.

In operation 775, the method generates at the processing unit 630 content based on the received data.

The processing unit 630 restores the content transmitted from the transmission apparatus 110 based on the received data.

A portion of the received data may be lost, compared to the data of the content output from the transmission apparatus 110. Because the reception apparatus 610 does not perform the cooperative reception, additional data may not be acquired. Due to the lost data, high quality content with a quality equal to that of the content of the transmission apparatus 110 may not be restored. Accordingly, the processing unit 630 restores low quality content based on the received data. In other words, a noncooperative reception apparatus decodes low quality content data. However, the noncooperative reception apparatus does not decode high quality data. As a result, low quality content may be acquired.

The above-description of FIGS. 1 through 6 is equally applicable to the example of FIG. 7. For example, operations 210, 220, 230, 235, 240, 245, 250, 310, 320, 340, 290, and 295 may correspond to operations 710, 715, 720, 730, 740, 745, 750, 752, 754, 756, 780, and 790, respectively. Additionally, operation 270 may correspond to operations 760 and 765, and operation 280 may correspond to operations 770 and 775. Operation 260 may correspond to operations 570 and 580. Accordingly, further description of the example of FIG. 7 is omitted herein.

Figure 8:
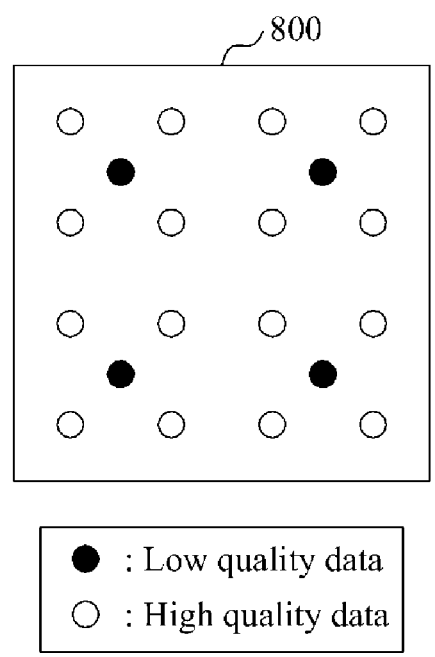
FIG. 8 is a diagram illustrating an example of a constellation diagram for content data, in accord with an embodiment.

FIG. 8 illustrates a constellation diagram 800 for content data, in accord with an embodiment.

The constellation diagram 800 of FIG. 8 represents the signal generated in operation 570 of FIG. 5. As shown in the constellation diagram 800, a high quality version and a low quality version of content data shared by a plurality of reception apparatuses are simultaneously transmitted through the signal generated in operation 570.

The constellation diagram 800 shows a set of message points. The message points may be, for example, digital symbols. Additionally, the message points may correspond to a set of signals transmitted by the transmission apparatus 110.

The constellation diagram 800 represents a distance between neighboring signals. In the constellation diagram 800, each low quality data is located at a center of four pieces of high quality data.

As described above, according to various examples, one or more reception apparatuses are provided with multicast services classified based on whether to participate in cooperative reception. Through the classified multicast services, a single transmission apparatus efficiently transmits content, for example a file and an image to a plurality of reception apparatuses.

The above-described examples may be applicable to various communication apparatuses, for example, smartphones, base stations, wireless local area network (WLAN) access points (AP), home appliances having a wireless communication function.

The units and apparatuses described herein may be implemented using hardware components. For example, the hardware components may include microphones, amplifiers, band-pass filters, audio to digital convertors, and processing devices.

A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

It is to be understood that in the embodiment of the present invention, the operations in FIGS. 5 and 7 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the methods described in FIGS. 5 and 7.

Program instructions to perform methods described in FIGS. 5 and 7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor implemented method of a receiver for generating a content, the method comprising:
   receiving, from a transmitter via a multicast, data comprising low quality data of encoded content and a first portion of high quality data of the encoded content from among the low quality data, the first portion of the high quality data, and a second portion of the high quality data of the encoded content;
   obtaining the second portion of the high quality data of the encoded content from another receiver, in a group of cooperative receivers, through a cooperative reception operation; and
   generating high quality content based on the first portion of the high quality data of the encoded content and the obtained second portion of the high quality data of the encoded content.

2. The method of claim 1, wherein the second portion of the high quality data of the encoded content is generated using network coding.

3. The method of claim 1, wherein a data transmission rate of the multicast data is equal to or higher than a data reception rate of the receiver.

4. The method of claim 3, wherein the data transmission rate of the multicast data is lower than or equal to a sum of the data reception rate of the receiver and data reception rates of the other receiver.

5. The method of claim 1, wherein a first network in which the multicast is performed, and a second network in which the cooperative reception operation is performed are different from each other.

6. The method of claim 1, wherein the receiving of the data comprising the low quality data and the first portion of the high quality data via multicast and the cooperative reception operation are performed through division of resources within a single network.

7. The method of claim 1, further comprising:
   forming a cooperation set for the cooperative reception operation.

8. The method of claim 1, further comprising:
   receiving an inquiry from the transmitter on whether to participate in the cooperative reception operation; and
   transmitting an answer to the inquiry to the transmitter.

9. The method of claim 8, wherein whether to participate in the cooperative reception operation is determined based on at least one of a performance of the receiver, a type of a first network in which the received data is transmitted, a second network in which the second portion of the high quality data of the encoded content is transmitted, a protocol supported by the receiver, a policy of the receiver, a capacity of a battery of the receiver, and a remaining capacity of the battery.

10. The method of claim 7, further comprising:
    receiving an additional information request for additional information used to form the cooperative set from the transmitter; and
    transmitting a response to the additional information request to the transmitter.

11. The method of claim 10, further comprising:
    generating the low quality data of the encoded content based on the received data; and
    obtaining the first portion of the high quality data of the encoded content by subtracting the low quality data of the encoded content from the received data,
    wherein a quality of the high quality data of the encoded content is greater than a quality of the low quality data of the encoded content.

12. A non-transitory computer-readable medium storing instructions that,
    when executed by one or more processors, cause the one or more processors to perform the method of claim 1.

13. An apparatus for generating a content, comprising:
    a communication unit configured to:
       receive, from a transmitter via a multicast, data comprising low quality data of encoded content and a first portion of high quality data of the encoded content from among the low quality data, the first portion of the high quality data, and a second portion of the high quality data of the encoded content; and
       obtain the second portion of the high quality data of the encoded content from another receiver, in a group of cooperative receivers, through a cooperative reception operation; and
    a processor configured to generate high quality content based on the first portion of the high quality data of the encoded content and the obtained second portion of the high quality data of the encoded content.

14. A processor implemented method of a transmitter for multicasting a content, the method comprising:
    determining a group of cooperative receivers participating in a cooperative reception operation among receivers configured to receive the content; and
    generating data comprising low quality data of encoded content and high quality data of the encoded content, wherein the high quality data of the encoded content is restored by network coding of the group; and
    multicasting the generated data for the encoded content to each of the receivers,
    wherein
       the low quality data of the encoded content and a first portion of the high quality data of the encoded content, from among the low quality data, the first portion of the high quality data, and a second portion of the high quality data of the encoded content, are received in a receiver of the group,
       the second portion of the high quality data of the encoded content is obtained through the cooperative reception operation with another receiver in the group, and high quality content is generated in the receiver of the group based on the first portion of the high quality data of the encoded content and the obtained second portion of the high quality data of the encoded content.

15. The method of claim 14, wherein a data transmission rate for the generated data is equal to or greater than a maximum data reception rate among data reception rates of the cooperative receivers.

16. The method of claim 14, further comprising:
transmitting an inquiry to each of the receivers on whether each of the receivers is to participate in the cooperative reception operation; and
receiving an answer to the inquiry from each of the receivers.

17. The method of claim 14, further comprising:
transmitting a request for additional information used to form a cooperative set to each of the cooperative receivers;
receiving a response to the request from each of the cooperative receivers;
forming information of the cooperative set based on the response; and
transmitting the information of the cooperative set to each of the cooperative receivers.

18. A non-transitory computer-readable medium, storing instructions that, when executed by one or more processors, cause the one or more processors to perform the method of claim 14.

19. An apparatus, comprising:
a processing unit configured to:
determine a group of cooperative receivers participating in a cooperative reception operation among receivers configured to receive content; and
generate data comprising low quality data of encoded content and high quality data of the encoded content, wherein the high quality data of the encoded content is restored by network coding of the group; and
a communication unit configured to multicast the generated data for the encoded content to each of the receivers,
wherein
the low quality data of the encoded content and a first portion of the high quality data of the encoded content, from among the low quality data, the first portion of the high quality data, and a second portion of the high quality data of the encoded content, are received in a receiver of the group,
the second portion of the high quality data of the encoded content is obtained through the cooperative reception operation with another receiver in the group, and
high quality content is generated in the receiver of the group based on the first portion of the high quality data of the encoded content and the obtained second portion of the high quality data of the encoded content.

20. A processor implemented method of a receiver for generating a content, the method comprising:
receiving, from a transmitter via a multicast, a signal corresponding to low quality data of encoded content and a first portion of high quality data of the encoded content from among the low quality data, the first portion of the high quality data, and a second portion of the high quality data of the encoded content;
obtaining the first portion of the high quality data of the encoded content by subtracting a signal corresponding to the low quality data from the received signal corresponding to the low quality data and the first portion of the high quality data;
obtaining the second portion of the high quality data of the encoded content from another receiver, in a group of cooperative receivers, through a cooperative reception operation; and
generating high quality content based on the first portion of the high quality data and the obtained second portion of the high quality data.

21. The method of claim 1, further comprising:
generating low quality content when an amount of the received data is less than or equal to a predetermined threshold.

22. The method of claim 1, wherein the generating the high quality content comprises:
generating the high quality content when an amount of the received data is greater than a predetermined threshold.

* * * * *